United States Patent
Nijim et al.

(10) Patent No.: US 10,136,188 B1
(45) Date of Patent: Nov. 20, 2018

(54) DISPLAY OF CONTENT IN A PROGRAM GUIDE BASED ON IMMEDIATE AVAILABILITY OF THE CONTENT

(75) Inventors: Yousef Wasef Nijim, Roswell, GA (US); Jay Paul Langa, Cumming, GA (US); Anant Pralhad Patil, Marietta, GA (US)

(73) Assignee: COX COMMUNICATIONS, INC, Atlanta, GA (US)

( * ) Notice: Subject to any disclaimer, the term of this patent is extended or adjusted under 35 U.S.C. 154(b) by 0 days.

(21) Appl. No.: 13/467,704

(22) Filed: May 9, 2012

(51) Int. Cl.
| | | |
|---|---|---|
| H04N 21/462 | (2011.01) | |
| H04N 21/482 | (2011.01) | |
| H04N 21/433 | (2011.01) | |
| H04N 21/231 | (2011.01) | |
| H04N 21/2665 | (2011.01) | |
| H04N 21/258 | (2011.01) | |
| H04N 21/45 | (2011.01) | |

(52) U.S. Cl.
CPC ..... *H04N 21/462* (2013.01); *H04N 21/23109* (2013.01); *H04N 21/25891* (2013.01); *H04N 21/2665* (2013.01); *H04N 21/4331* (2013.01); *H04N 21/4532* (2013.01); *H04N 21/4622* (2013.01); *H04N 21/482* (2013.01); *H04N 21/4821* (2013.01)

(58) Field of Classification Search
CPC ........... H04N 21/462; H04N 21/46221; H04N 21/482; H04N 21/4821; H04N 21/4332; H04N 21/23109; H04N 21/2665; H04N 21/25891; H04N 21/4532
See application file for complete search history.

(56) References Cited

U.S. PATENT DOCUMENTS

| | | | | |
|---|---|---|---|---|
| 6,034,677 A | * | 3/2000 | Noguchi | H04N 5/44543 348/566 |
| 2002/0007488 A1 | * | 1/2002 | Kikinis | H04H 60/72 725/40 |
| 2002/0087982 A1 | * | 7/2002 | Stuart | H04N 5/44543 725/39 |
| 2002/0133819 A1 | * | 9/2002 | Jackson | H04N 5/44543 725/39 |
| 2003/0106060 A1 | * | 6/2003 | Inoue | H04N 5/44543 725/56 |
| 2003/0110492 A1 | * | 6/2003 | Thurston | H04N 5/44543 725/39 |
| 2004/0205816 A1 | * | 10/2004 | Barrett | H04N 5/76 725/49 |
| 2005/0204388 A1 | * | 9/2005 | Knudson | H04N 5/44543 725/58 |
| 2005/0228806 A1 | * | 10/2005 | Haberman | G06F 17/30265 |
| 2006/0179468 A1 | * | 8/2006 | Pearson | H04N 5/44543 725/110 |
| 2007/0192793 A1 | * | 8/2007 | Song | H04N 5/44543 725/39 |

(Continued)

*Primary Examiner* — Robert J Hance
(74) *Attorney, Agent, or Firm* — Merchant & Gould

(57) ABSTRACT

Data associated with content available for immediate viewing is aggregated into a program guide. A plurality of content sources for content available for immediate viewing is mined to obtain data associated with the content available for immediate viewing from the plurality of content sources. The mined data is processed to create a program guide identifying the content available for immediate viewing. The program guide displaying the identified content available for immediate viewing is presented to a user.

19 Claims, 6 Drawing Sheets

(56) References Cited

U.S. PATENT DOCUMENTS

| | | | |
|---|---|---|---|
| 2008/0141317 A1* | 6/2008 | Radloff | H04N 5/44582 725/87 |
| 2009/0158325 A1* | 6/2009 | Johnson | G06F 17/30017 725/38 |
| 2010/0115557 A1* | 5/2010 | Billmaier | G06F 17/30029 725/44 |
| 2010/0262997 A1* | 10/2010 | Dove | H04N 5/44543 725/44 |
| 2011/0164861 A1* | 7/2011 | Kunkel | H04N 5/76 386/343 |
| 2012/0102530 A1* | 4/2012 | Quan | H04N 5/44513 725/50 |
| 2012/0144428 A1* | 6/2012 | Alder | H04N 21/4147 725/53 |
| 2012/0238363 A1* | 9/2012 | Watanabe | H04N 21/472 463/31 |
| 2012/0278844 A1* | 11/2012 | Curtis | H04N 21/4147 725/93 |
| 2012/0297421 A1* | 11/2012 | Kim | H04N 5/445 725/41 |
| 2012/0304219 A1* | 11/2012 | Olague | H04N 5/44543 725/27 |
| 2013/0335637 A1* | 12/2013 | Kassam | H04N 5/44543 348/725 |

\* cited by examiner

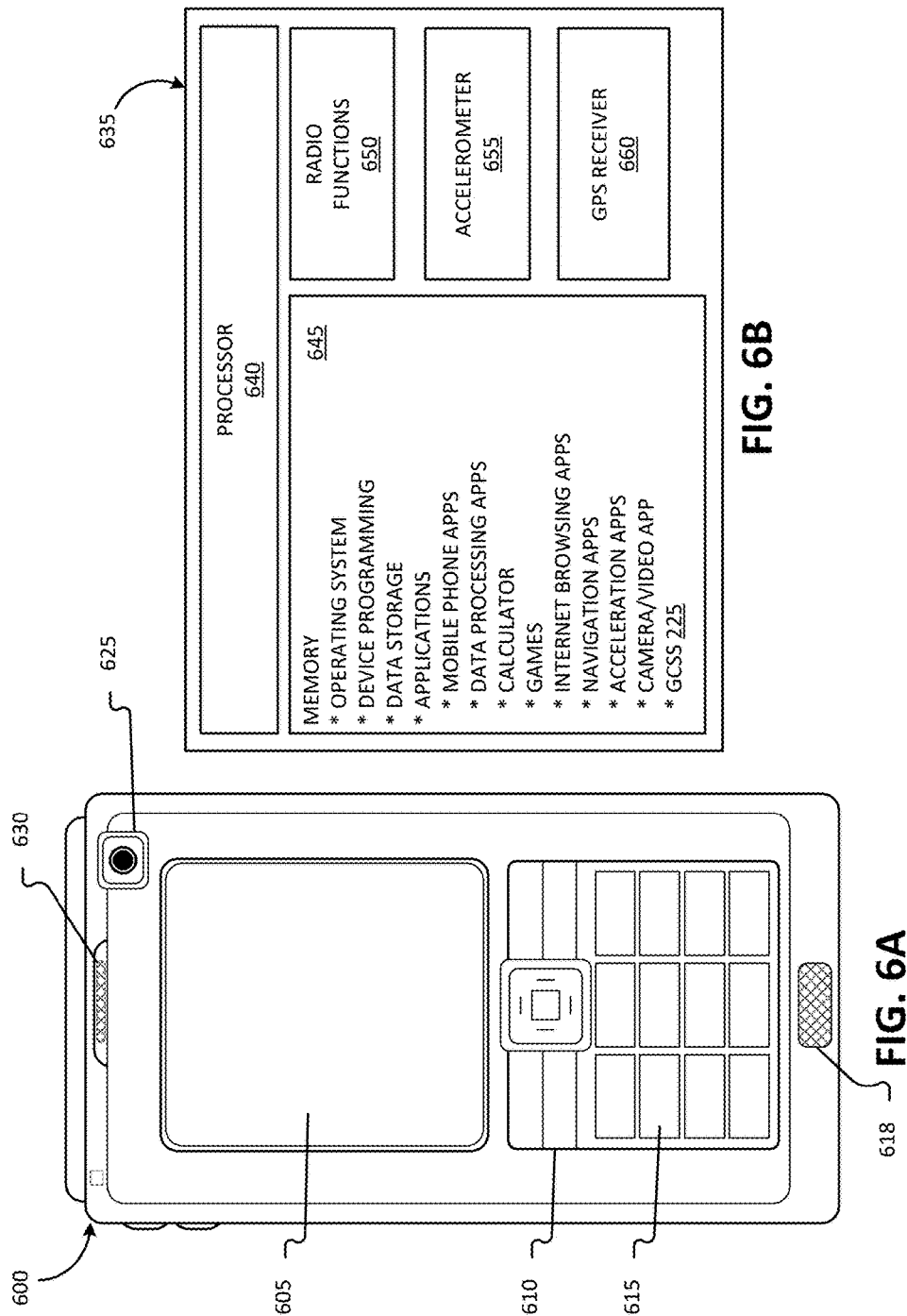

US 10,136,188 B1

DISPLAY OF CONTENT IN A PROGRAM GUIDE BASED ON IMMEDIATE AVAILABILITY OF THE CONTENT

FIELD OF THE INVENTION

This disclosure relates in general to management of content availability service systems, and more particularly to displaying content on the program guide based on immediate availability.

BACKGROUND

Currently, program guides display availability of linear programs. The program guide allows the user to navigate programs and times that will be shown within a predetermined time window, e.g., programs available for viewing in the next fourteen days. However, if the user wants to view programs that are available on video-on-demand (VOD), for example, the user has to navigate to a VOD menu. Similarly, a user must navigate to a different menu to identify programming available for streaming or downloading from the Internet. Thus, there is no aggregated view of linear programming, VOD programming, programming available for streaming or downloading from the Internet, etc.

Another issue users have with the current program/content delivery process involves missing programs. Sometimes a user forgets particular content of interest is going to be available for viewing and does not access the content when it is being delivered. Digital video recording (DVR) devices have helped in this regard. However, DVRs are only useful if the user is aware ahead of time that content of interest is going to be available for viewing and the user remembers to program the DVR to capture the content of interest when it is delivered. Although some content is available later in a rerun of the content or on the Internet, e.g., Hulu®, YouTube®, Netflix®, blinkx®, EPIX, etc., most content is not shown again or, if possibly shown in the future, is beyond the normal 14-day window in most programming guides. Accordingly, the user normally has no recourse to be able to watch a program that the user has missed.

SUMMARY OF THE INVENTION

To overcome the limitations described above, and to overcome other limitations that will become apparent upon reading and understanding the present specification, embodiments for aggregating and providing a listing of content available for immediate viewing are disclosed.

The above-described problems are solved by identifying content available for immediate viewing from various content sources and displaying the selected content on a program guide. This allows the customer to display guide data on their devices based on the immediate availability of the content.

An embodiment includes a method for aggregating available content for immediate viewing. The method includes accessing a plurality of content sources for programs available for immediate viewing; mining data associated with programs available for immediate viewing from the plurality of content sources; processing the mined data to create a program guide identifying the programs available for immediate viewing; and presenting a program guide displaying the identified programs available for immediate viewing.

In another embodiment, a system for aggregating available content for immediate viewing is disclosed. The system includes memory for storing data and guide content selection system (GCSS) operable to access a plurality of content sources having content available for immediate viewing, mine data associated with content available for immediate viewing from the plurality of content sources, store the mined data in memory, process the mined data to create a program guide identifying the content available for immediate viewing, and to present the program guide displaying the identified content available for immediate viewing.

A computer readable medium including executable instructions which, when executed by a processor, aggregates data associated with content available for immediate viewing, is disclosed. The computer readable medium includes instructions executable by the processor to access a plurality of content sources having content available for immediate viewing, mine data associated with content available for immediate viewing from the plurality of content sources, process the mined data to create a program guide identifying the content available for immediate viewing and present the program guide displaying the identified content available for immediate viewing.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout:

FIGS. 6*a*-*b* illustrate a suitable mobile computing environment, for example, a mobile computing device, a smart phone, a tablet personal computer, a laptop computer, and the like, with which embodiments may be practiced.

DETAILED DESCRIPTION

Embodiments of the present invention are directed to providing program guide data based on the immediate availability of content.

Figure 1:
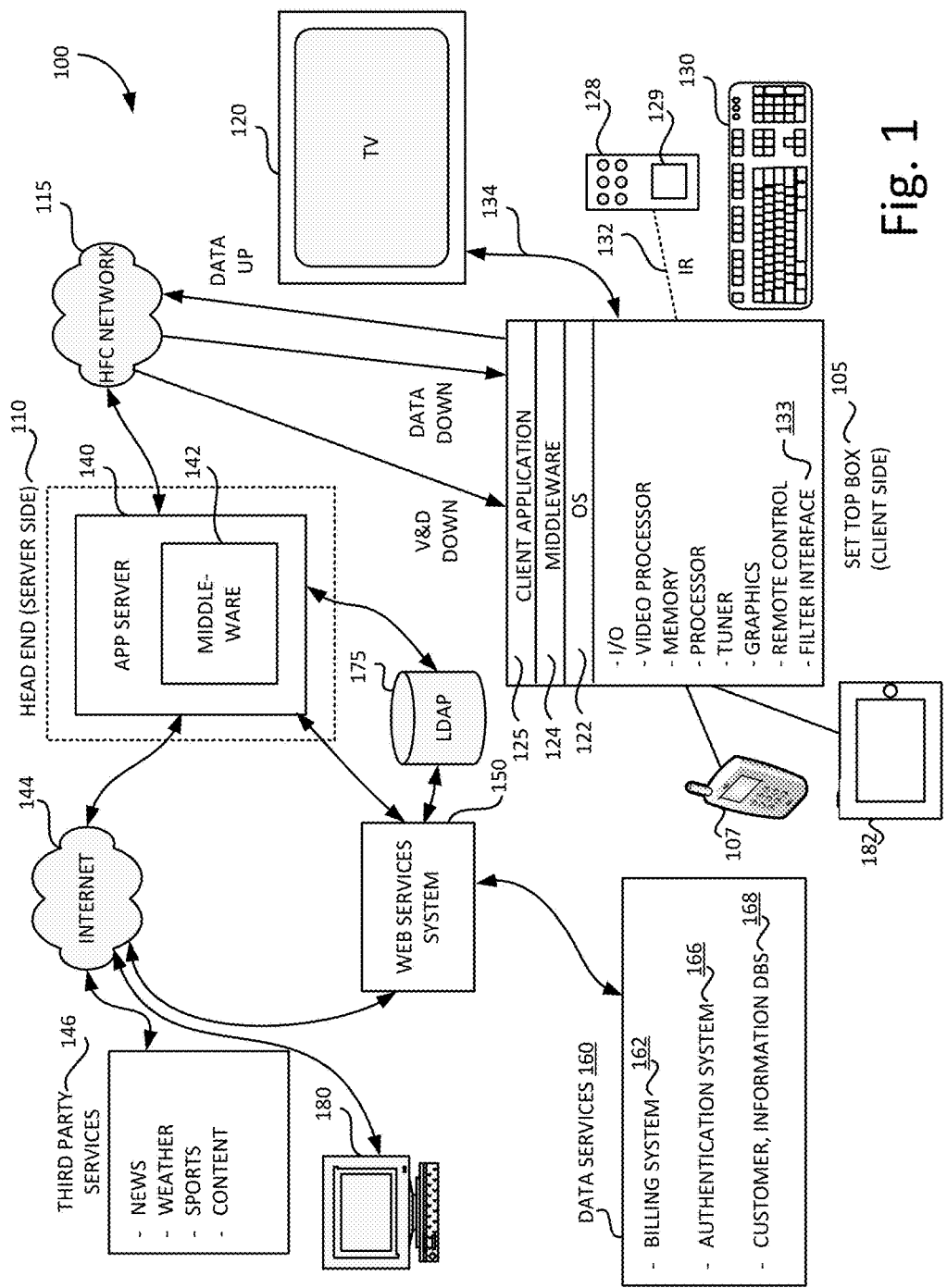
FIG. 1 is a simplified block diagram illustrating a cable television/services system (hereafter referred to as "CATV") architecture providing an operating environment according to an embodiment.

FIG. 1 is a simplified block diagram illustrating a cable television/services system 100 (hereafter referred to as "CATV") architecture providing an operating environment according to an embodiment. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of subscribers. Coaxial cable runs from the optical fiber feeders to each customer or subscriber. The functionality of the HFC network 115 allows for efficient bidirectional data flow between the client-side set-top box 105 and the server-side application server 140 of the embodiment.

The CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory, and an input/output mechanism. The input/output mechanism receives input from server-side processes via the HFC network 115 and from customers via input devices such as the remote control device 128, keyboard 130, or other computing device 180, such as a tablet/slate computer, smart phone, etc. STB 105 provides a filter interface 133 for presenting filtered programming and/or content via STB 105 on the TV 120. While the filter interface 133 may be implemented using STBs 105, 106, the person having ordinary skills in the art will understand that the filter interface 133 may be provided through wireless device 107, any type of network media device 182, or any device capable of interfacing with a STB 105 or in a server or other module on the headend side 110. Such devices may include DVRs, wireless phones, PCs, laptop computers, tablet/slate computers, media viewing devices, or equivalents thereof. Further, filter interface 133 may be provided through a STB. The remote control device 128 and the keyboard 130 may communicate with the STB 105 via a suitable communication transport such as the infrared connection 132. The remote control device 128 may include a biometric input module 129. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 125 responsible for displaying news items.

Because a variety of different operating systems 122 may be utilized by a variety of different brands and types of set-top boxes, a middleware layer 124 may be provided to allow a given software application to be executed by a variety of different operating systems. According to an embodiment, the middleware layer 124 may include a set of application programming interfaces (APIs) that are exposed to client applications 125 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. The middleware layer 142 of the server-side application server and the middleware layer 124 of the client-side STB 105 may format data passed between the client side and server side according to the Extensible Markup Language (XML).

According to one embodiment, the set-top box 105 passes digital and analog video and data signaling to the television 120 via a one-way communication transport 134. According to other embodiments, two-way communication transports may be utilized, for example, via high definition multimedia (HDMI) ports. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 1, between the HFC network 115 and the set-top box 105 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 144 for transmitting to a customer through the HFC network 115 and the set-top box 105. For example, content metadata a third-party content provider service may be downloaded by the application server via the Internet 144. When the application server 140 receives the downloaded content metadata, the middleware layer 142 may be utilized to format the content metadata for receipt and use by the set-top box 105. Therefore, content metadata may be sent and categorized based on the availability to the customer's program guide data.

According to one embodiment, data obtained and managed by the middleware layer 142 of the application server 140 is formatted according to the Extensible Markup Language and is passed to the set-top box 105 through the HFC network 115 where the XML-formatted data may be utilized by a client application 125 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments, the billing system 162 may also include billing data for services and products subscribed to by the customer for bill processing, billing presentment and payment receipt.

A customer information database 168 may include general information about customers such as place of employment, business address, business telephone number, and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

Referring still to FIG. 1, web services system 150 is illustrated between the application server 140 and the data services 160. According to embodiments, web services system 150 serves as a collection point for data requested from each of the disparate data services systems comprising the data services 160. According to embodiments, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

An authentication system 166 may include information such as secure user names, subscriber profiles, subscriber IDs, and passwords utilized by customers for access to network services. As should be understood by those skilled in the art, the disparate systems 150, 162, 166, 168, 175 may be integrated or provided in any combination of separate systems, wherein FIG. 1 shows only one example.

Figure 2:
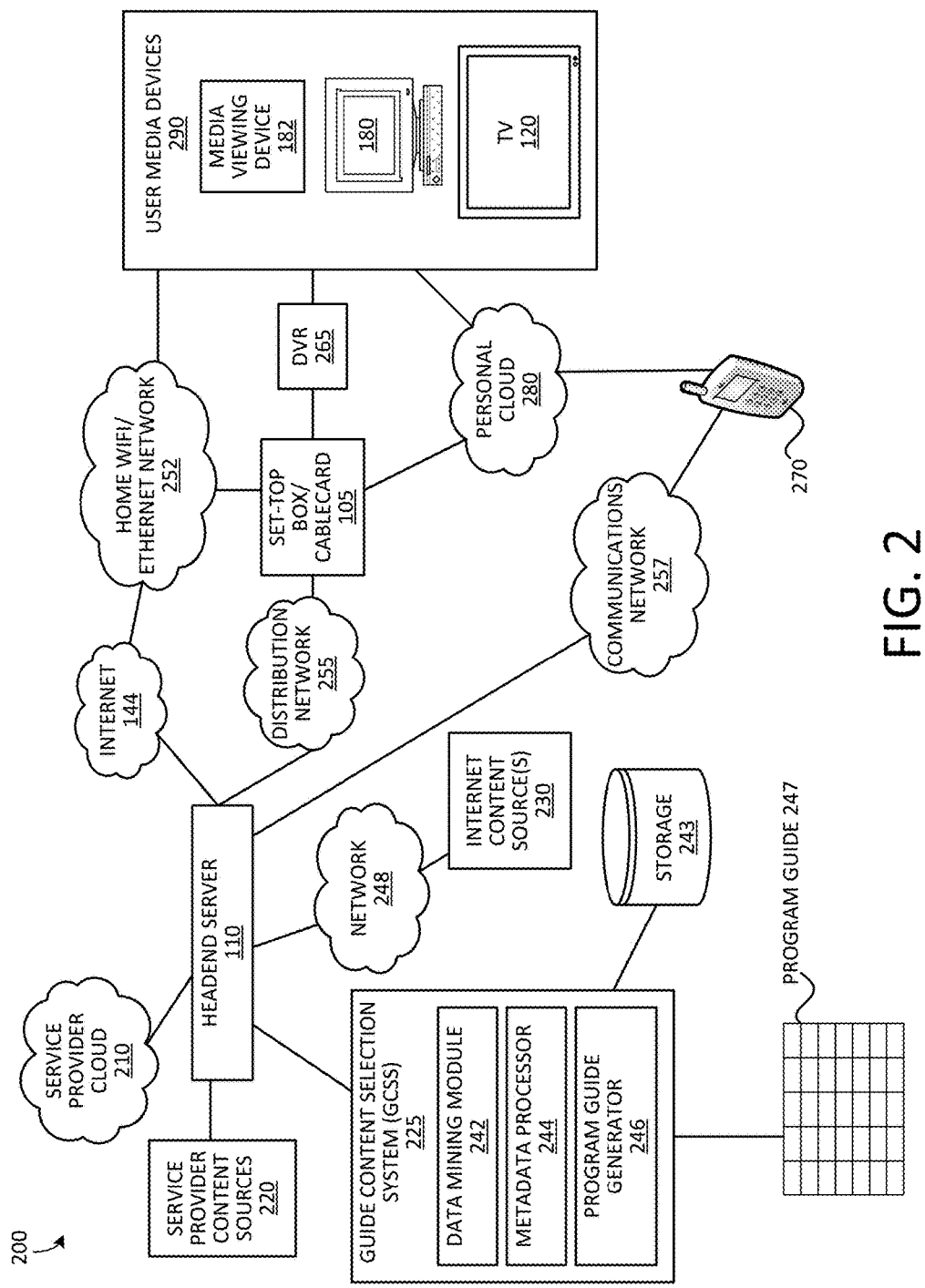
FIG. 2 is a diagram of an exemplary system that provides availability information associated with video content from a plurality of sources according to one embodiment.

FIG. 2 is a diagram of an exemplary system 200 that provides availability information associated with video content from a plurality of sources according to one embodiment. A guide content selection system (GCSS) 225 is illustrative of one or more computing components to which metadata for linear and non-linear programs may be provided for analyzing, categorizing, processing, storing, and linking with other available data for creating a linear program guide. According to embodiments, each of the components of the GCSS 225 illustrated in FIG. 2 may operate as standalone components that are operatively connected with a data hub for providing and receiving data in association with programming content and availability, business rules, profiles, devices, etc. That is, the data mining module 242, storage 243, metadata processor, 244, and the program guide generator 246 may be independent operating entities located at disparate locations and that are operative for creating a program guide displaying guide data based on the immediate availability of the content. The components 242, 243,244,246 may operate as a collection of computing devices and data storage repositories at a single location. Alternatively, the components may be operated as a distributed computing network where one or more of the components may be located at disparate locations relative to other components, all of which may be connected via a distributed computing network, such as the Internet or an intranet. According to other embodiments, the data mining module 242, storage 243, metadata processor, 244, and the program guide generator 246 may be integrated or may operate in a variety of combinations of components. One or more of the components 242,244,246 of the GCSS 225 may operate as a component of the headend server 110.

The headend server 110 may provide different metadata for non-linear programs/content. The guide content selection system (GCSS) 225 may receive metadata for non-linear programs/content from a headend server 110 as well as metadata from other service provider content sources 220, such as Video On Demand (VOD) and video content available through a network 248 from Internet content sources 230, e.g., Hulu® or YouTube®.

Additionally, the GCSS 225 may receive customer's purchased content, content available from the customer's cloud 280 or content from the service provider's cloud 210. Content metadata may be categorized based on the availability and sent to the customer's devices for maintaining or using the program guide data. The customer's devices may include a set-top box/Cablecard 105, a DVR 265, a smart phone 270, and user media devices 290. A smart phone 270 may receive data via a communications network 257 or by access the customer's personal cloud 280.

The GCSS 225 may include a data mining module 242 operable to access content sources to retrieve data associated with content that is available for immediate viewing. Data mining module 242 may stores the mined data in storage 243. The data mining module 242 then analyzes the data from different perspectives or sources and summarizes the mined data into useful information. The data mining module 242 may categorize the content, for example, based on the day/time/customer preferences, to display the data on a program guide 247. The GCSS 225 may include a metadata processor 244 operable to process the linear video program guide data, store past program guide data, process other available data, determine a duration for maintaining the data, link the other available data and insert the data in a program guide generator 246. The program guide generator 246 may be utilized to create a program guide 247 for display on the user media devices 290. The program guide 247 may display all available options to the customer based on the processed information.

The customer site includes home WiFi/Ethernet network 252 that provide access to the Internet 144, a set-top box/Cablecard 105, DVR 265, and user media devices 290. The home WiFi/Ethernet network 252 may receive data and transfer the data to the appropriate device such as the STB/Cablecard 105, DVR 265 or user media devices 290. Likewise, the home WiFi/Ethernet network 252 may receive data from any device on the customer site and transmit the data to other devices in network system 200. STB/Cablecard 105 may receive content through the headend server 110 via the distribution network 255 and provide the content to the user media device 290, e.g., media viewing device 182, television 120, and computer 180, for display.

The display of content available for immediate viewing on the program guide 247 may be configured based on behavior of the user. The user may set parameters or otherwise configure the program guide 247 to display content available for immediate viewing according to a genre, selected titles, actors, directors or other characteristics. Thus, the program guide 247 may be configured to display on any type of device the user is interested in viewing content on. For example, the program guide 247 may be configured to display programs available for immediate viewing on a smart phone 270 or for immediate viewing on a tablet device. Moreover, the displayed content available for immediate viewing may present options for viewing content on a selected device, wherein the content provided to the selected device of the user may be configured for that device. Digital rights management may dictate that certain content is available for viewing on only a particular device.

Figure 3:
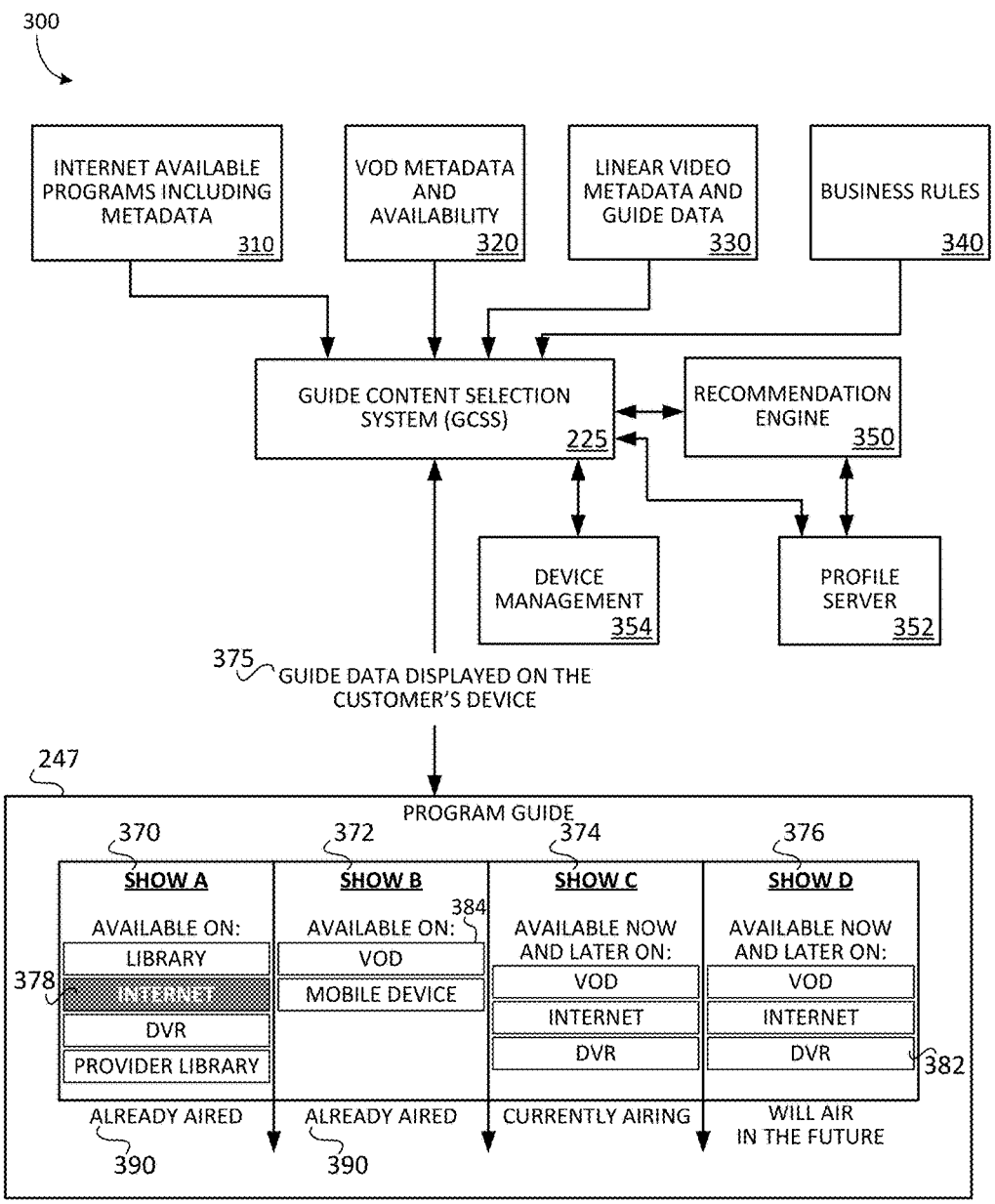
FIG. 3 is a flow diagram for displaying guide data on a user's device based on immediate availability of the content according to one embodiment.

FIG. 3 is a flow diagram 300 for displaying guide data on the customer's device based on immediate availability of the content according to an embodiment. A program guide 247 according to an embodiment provides availability information associated with video content from a plurality of sources 310, 320, 330, 340. For example, sources 310,320, 330,340 may include programming data, metadata and availability information associated with content available via a service provider content source 220, service provider cloud 210, internet content source 230, STB/cablecard 105, DVR 265, or a user's personal cloud 280. Thus, if a program (e.g., Show A 370) is available from an internet content source 310, the information on the availability of that program 370 will be presented in the program guide 247. As illustrated in FIG. 3, a link 378 to the location of the program 370 on the internet content source (e.g., a website) 310 may be associated with the program availability information and may be provided in the program guide 247. Such link 378 may be visible or may be embedded in the program availability information. Thus, the user may be able to watch the program from the internet content source 310 without step-by-step navigating to the website 310. Likewise, if a program (e.g., Show B 372) is a VOD asset 320, a link 384 may be provided in the program guide 247 so the user may be directed to the VOD asset 320. Linear video programs 330 may also be provided via a set-top box 105 or a DVR 265.

Available content may be automatically filtered based on customer preferences or viewing conditions and based on additional business rules 340. The recommendation engine 350 (e.g. could be handled at the backend) may generate predictions regarding program selection. A profile server 352 may be provided to obtain a user profile based at least in part on the user and device information. For example, if a user typically accesses media content via a tablet computing device 182 rather that via a STB 105, the user profile for the user may include information indicating such behavior which may be utilized to provide program guide data associated with programming available to the user via his tablet computing device rather than programming available via a STB. The user profile server 352 may also include information regarding parental control settings. A device management server 354 may also be provided to provide information regarding devices on a user account, which may then be provided to the user profiles. The recommendation engine 350 may access the user profile server 352 to apply a user profile to the generated predictions regarding program selection. Such predictions may be based on a determination of on what device the user typically watches content, where the user is located, etc. The recommendation engine 350 may also identify the device the user is currently using and provide a display of available content in the program guide based on the identified device (375). Once the information is collected from metadata associated with content by the GCSS 225, business rules 340 may then be applied to recommendations 350. GCSS 225 may also apply parental controls associated with a user and/or a user device. Business rules 340 may specify, for example, a priority for VOD 320 over the Internet 310, a priority to linear programming on the user's DVR 330, a priority based on pricing, etc. The business rules 340 may be correlated to marketing rules to configure what content available for immediate viewing are displayed in the program guide 247.

Additional guide data could be displayed on the program guide 247 while the customer is navigating the program guide 247 or could be filtered out based on the customer preferences. A customer could navigate already aired programming 390; the guide 247 may display the missed shows (already aired programming) 390, and may display links 378,384,382 and information about the availability of the programs 370,372,374,376 on other platforms or devices. For example, if a program (e.g., Show B 372) is available On Demand 384, a direct link to the program may be provided for allowing the customer to start watching the program after selecting the link 384 on the program guide 247. Other program availability is based on the customer subscription to certain tiers and networks. Links 378,384,382 to the available programs may be dynamically removed when the content becomes unavailable.

Figure 4:
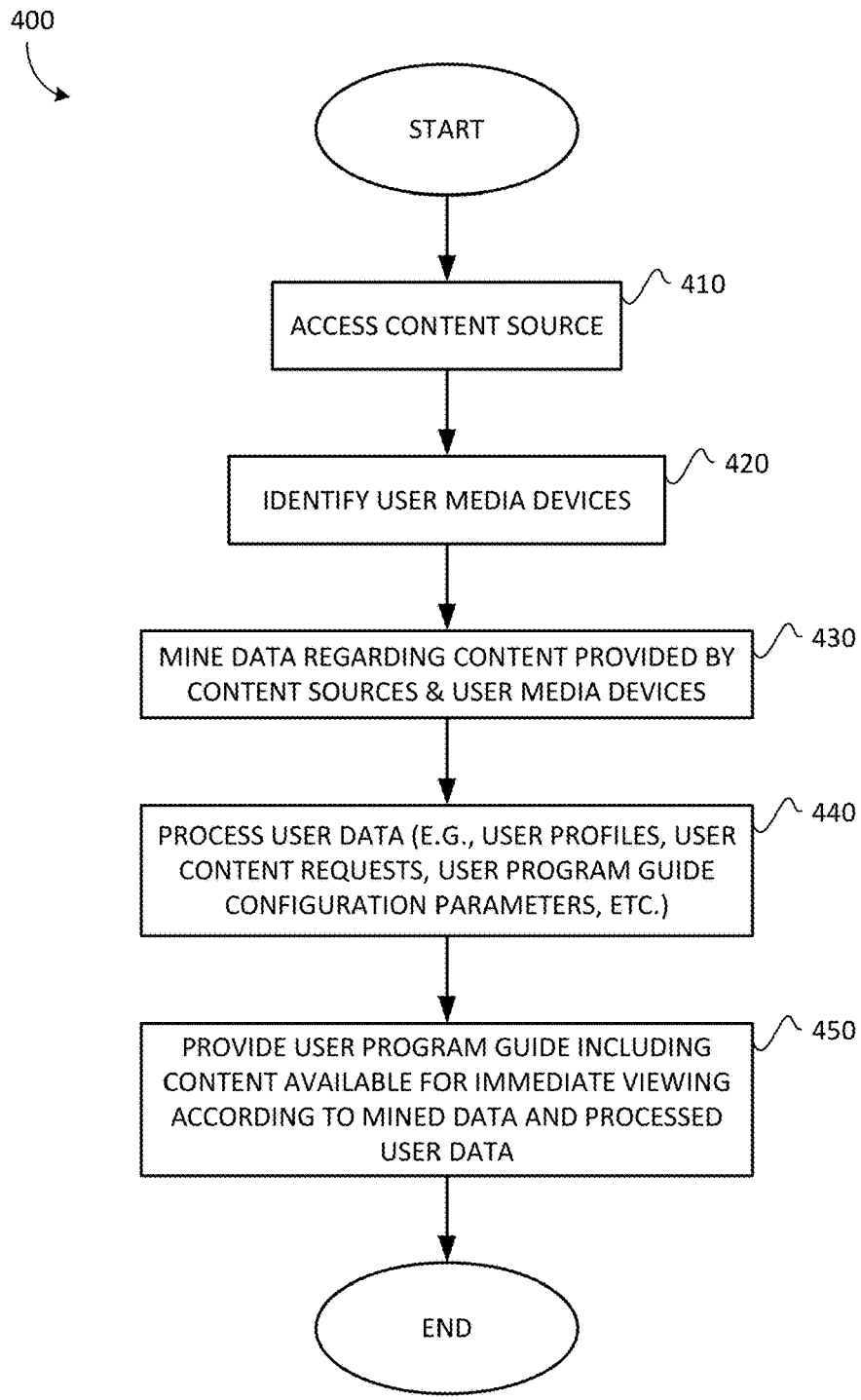
FIG. 4 is a flow chart of a method for displaying guide data on user devices based on the immediate availability of the content according to an embodiment.

FIG. 4 is a flow chart 400 of displaying guide data on user devices based on the immediate availability of the content according to an embodiment. Content metadata available via various content sources and in various delivery formats (e.g., VOD, internet content sources, service provider content sources, content available in a user's personal cloud, etc.) and available for immediate viewing may be provided to the GCSS 225 (410). The content may include the service provider's content sources 210,220 as well as internet content sources 230. The user may identify preferred media devices 290,182,180,120 to use for viewing programs (420). In order to determine immediate availability of content, data mining of content provided by content sources and user media devices is performed (430). User data may be processed (440). For example, user profiles 352, user content requests, user program guide configuration parameters, etc. may be processed. A user program guide 247 is created that includes content available for immediate viewing according to mined data and processed user data (450).

Figure 5:
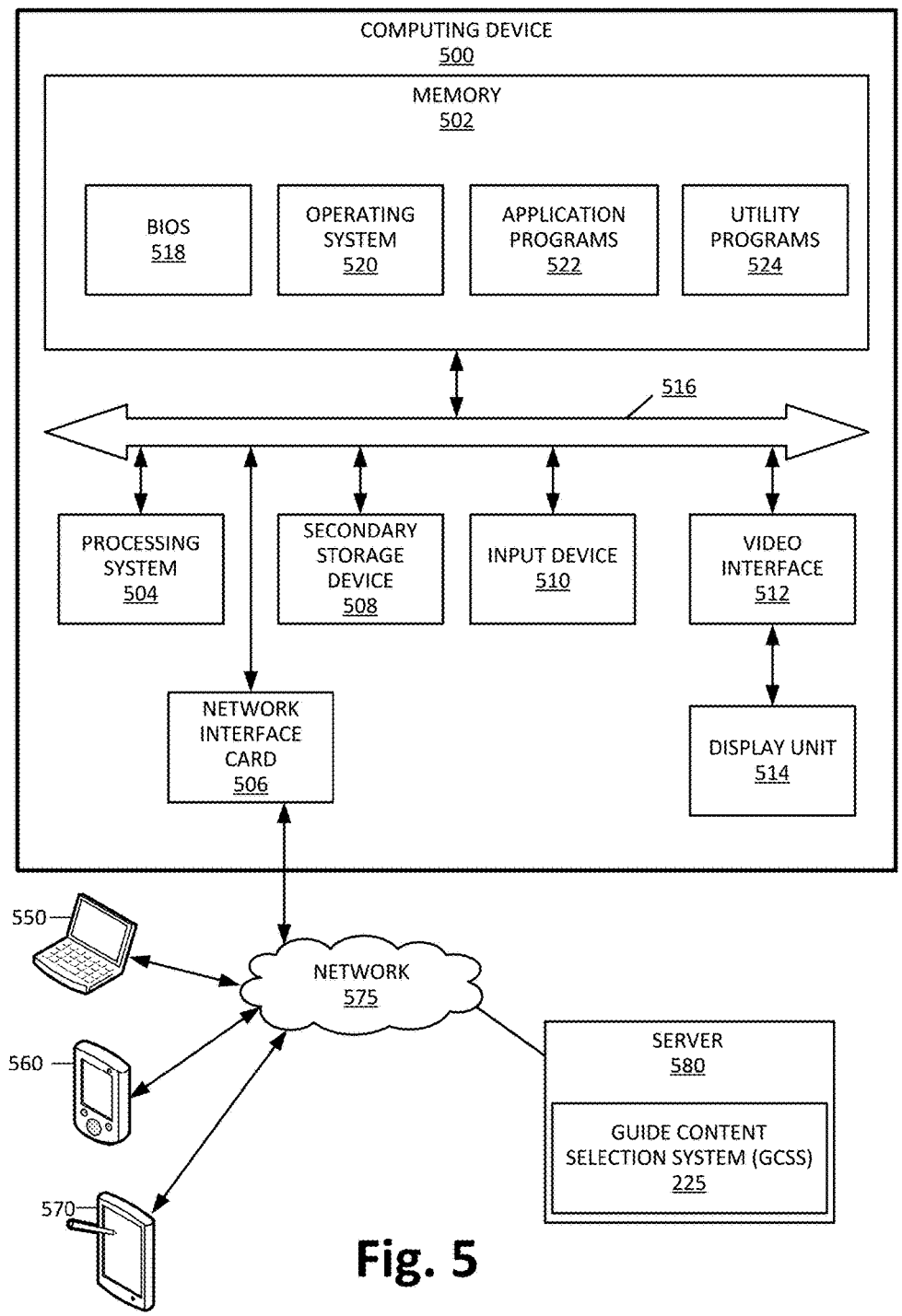
FIG. 5 is a block diagram illustrating example physical components of a computing device and a system architecture for providing a program guide content selection application that displays content based on immediate availability, as described above.

FIG. 5 is a block diagram illustrating example physical components of a computing device 500 with which embodiments may be practiced. In some embodiments, one or a combination of the components 242,244,246 of the GCSS 225 may be implemented using one or more computing devices like the computing device 500. It should be appreciated that in other embodiments, components of the GCSS 225 may be implemented using computing devices having hardware components other than those illustrated in the example of FIG. 5.

Computing devices may be implemented in different ways in different embodiments. For instance, in the example of FIG. 5, the computing device includes a processing system 504, memory 502, a network interface 506, a secondary storage device 508, an input device 510, a video interface 512, a display unit 514, and a communication medium 516. In other embodiments, the computing device 500 may be implemented using more or fewer hardware components (e.g., a video interface, a display unit, or an input device) or in combination with other types of computer systems and program modules.

The memory 502 includes one or more computer-readable storage media capable of storing data and/or computer-executable instructions. According to one embodiment, one or a combination of the components 242,244,246 of the GCSS 225 may be stored locally on computing device 500. Memory 502 thus may store the computer-executable instructions that, when executed by processor 504, cause the GCSS 225 to process the mined data to create a program guide identifying programs available for immediate viewing as described above with reference to FIGS. 1-4.

In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more Intel Core microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be a an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs 522 that, when executed by the processing system 504, cause the computing device 500 to provide applications to users, for example, one or more of the components 242,244,246 of the GCSS 225. The memory 502 also stores one or more utility programs 524 that, when executed by the processing system 504, cause the computing device 500 to provide utilities to other software programs.

Embodiments of the present invention may be utilized in various distributed computing environments where tasks are performed by remote processing devices that are linked through a communications network in a distributed computing environment.

Moreover, embodiments may be implemented such that each or many of the components illustrated in FIG. 5 may be integrated onto a single integrated circuit. When operating via such a single integrated circuit, the functionality, described herein, with respect to the GCSS 225 may be operated via application-specific logic integrated with other components of the computing device/system 500 on the single integrated circuit.

A server 580 may provide one or more of the components 242,244,246 of the GCSS 225 to client devices. As one example, server 580 may be a web server providing the GCSS 225 components over the web. Server 580 may provide the GCSS 225 components over the web to clients through a network 575. Examples of clients that may obtain the GCSS 225 components include computing device 550, which may include any general purpose personal computer (such as computing device 500), a tablet computing device 570 and/or mobile computing device 560, such as smart phones.

FIGS. 6*a*-*b* illustrate a suitable mobile computing environment, for example, a mobile computing device 600, a smart phone, a tablet personal computer, a laptop computer, and the like, with which embodiments may be practiced. The mobile computing device 600 is illustrative of any suitable device operative to send, receive and process wireless communications according to embodiments of the present invention. A display screen 605 is operative for displaying a variety of information such as information about incoming and outgoing communications, as well as, a variety of data and displayable objects, for example, text, alphanumeric data, photographs, and the like.

Data input to the device 600 may be performed via a variety of suitable means, such as, touch screen input via the display screen 605, keyboard or keypad input via a data entry area 610, key input via one or more selectable buttons or controls 615, voice input via a microphone 618 disposed on the device 600, photographic input via a camera 625 functionality associated with the mobile computing device, or any other suitable input means. Data may be output via the device 600 via any suitable output means, including but not limited to, display on the display screen 605, audible output via an associated speaker 630 or connected earphone system, vibration module for providing tactile output, and the like.

Referring now to FIG. 6*b*, operational unit 635 is illustrative of internal operating functionality of the mobile computing device 600. A processor 640 is illustrative of a general purpose computer processor for processing incoming and outgoing data and communications and controlling operation of the device and associated software applications via a mobile computing device operating system. Memory 645 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, one or more components of the GCSS 225 may be stored locally on mobile computing device 600.

Mobile computing device 600 may contain an accelerometer 655 for detecting acceleration, and can be used to sense orientation, vibration, and/or shock. Mobile computing device 600 may contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the device 600 to communicate with other communication devices and systems via a wireless network. Radio functions 650 may be utilized to communicate with a wireless or WIFI-based positioning system to determine a device's 600 location.

Although described herein in combination with mobile computing device 600, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-7. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method, implemented using a computing device, for aggregating available content for viewing, comprising:
    identifying devices associated with a user for use in viewing content, each device being associated with a digital rights management setting that dictates the content that is available for viewing on the device;
    mining data associated with content available for viewing on the devices from a plurality of content sources, the plurality of content sources including linear content sources and non-linear content sources;
    processing the mined data to create a program guide identifying programs from the content and availability information for viewing of the programs on the devices, the availability information identifying a delivery format for each of the plurality of content sources through which the programs are available for viewing, the delivery format identifying whether a program is provided by a linear content source or a non-linear content source video for each of the plurality of content sources; and
    presenting the program guide, for a particular device, displaying an identified program that has already aired via a linear content source, wherein an instance of the identified program is selectable for viewing on the particular device from a plurality of links corresponding with non-linear content sources, the program guide dynamically generating the links as the content becomes available for viewing through the non-linear content sources and dynamically removing the links as the content becomes unavailable for viewing through the non-linear content sources,
    wherein a preference is set by the user for the devices identified as associated with the user for use in viewing content identifying a preferred device for viewing content, and wherein the preference is used to exclude content items from the program guide that are not available to the user on the preferred device.

2. The method of claim 1 wherein the program guide identifies a second device associated with a user for use in viewing the program.

3. The method of claim 1, wherein mining data associated with the content available for viewing further comprises receiving data associated with content having already aired and is available for viewing.

4. The method of claim 1, wherein mining data associated with the content available for viewing further comprises receiving data associated with content scheduled for delivery in the future and is available for viewing.

5. The method of claim 1, wherein processing the mined data to create the program guide identifying the program from the content available for viewing comprises including content recommended based on a user profile.

6. The method of claim 1, further comprising receiving filter parameters from the user for filtering the content to provide a filtered listing of content in the program guide.

7. The method of claim 6, further comprising processing the filtered content to identify programs related to the content in the filtered listing for inclusion in the program guide, wherein the filtering of content is performed automatically based on user preferences and business rules.

8. The method of claim 1, wherein presenting the program guide displaying the identified program and the availability information identifying the delivery format for each of the plurality of content sources through which the program is available for viewing comprises presenting the program guide when the user is navigating the program guide.

9. A system for aggregating available content for viewing, comprising:
    memory for storing data; and
    a guide content selection system operative to:
        identify devices associated with a user for use in viewing content, each device being associated with a digital rights management setting that dictates the content that is available for viewing on the device;
        mine data associated with content available for viewing on the devices from a plurality of content sources, the plurality of content sources including linear content sources and non-linear content sources;
        store the mined data in memory;
        process the mined data to create a program guide identifying programs from the content and availability information for viewing of the programs on the devices, the availability information identifying a delivery format for each of the plurality of content sources through which the programs are available for viewing, the delivery format identifying whether a program is provided by a linear content source or a non-linear content source video for each of the plurality of content sources; and present the program guide, for a particular device, displaying an identified program that has already aired via a linear content source, wherein an instance of the identified program is selectable for viewing on the particular device from a plurality of links corresponding with non-linear content sources, the program guide including dynamically generating the links as the content becomes available for viewing through the non-linear content sources and dynamically removing the links as the content becomes unavailable for viewing through the non-linear content sources, wherein dynamically generating the links to content prioritizes linear content sources from the plurality of content sources to dynamically generate the link, and identifying other devices associated with the user through which the program is available for viewing, wherein a preference is set by the user for the devices identified as associated with the user for use in viewing content identifying a preferred device for viewing content, and wherein the preference is used to exclude content items from the program guide that are not available to the user on the preferred device.

10. The system of claim 9, wherein the program guide identifies a second device associated with the user for use in viewing the program.

11. The system of claim 9, wherein the content available for viewing includes content having already aired and available for viewing.

12. The system of claim 9, wherein the content available for viewing includes content scheduled for delivery in the future and available for viewing.

13. The system of claim 9, wherein the mined data includes content recommended based on a user profile.

14. The system of claim 9, wherein the guide content selection system is further operable to receive filter parameters and filter the content to provide a filtered listing of content in the program guide, the filtered content including content identified to be related to the content in the filtered listing.

15. The system of claim 14, wherein the guide content selection system filters the content automatically based on user preferences and business rules.

16. The system of claim 9, wherein the program guide includes the content available to the user based on a subscription level for the user.

17. A computer-readable storage device which stores a set of instructions which when executed performs a method for aggregating data associated with content available for viewing, the method executed by the set of instructions comprising:

accessing a plurality of content sources having the content available for viewing;

identifying devices associated with a user for use in viewing content, each device being associated with a digital rights management setting that dictates the content that is available for viewing on the device;

mining data associated with the content available for viewing on the devices from the plurality of content sources, the plurality of content sources including linear content sources and non-linear content sources;

processing the mined data to create a program guide identifying programs from the content and availability information for viewing of the programs on the devices, the availability information identifying a delivery format for each of the plurality of content sources through which the programs are available for viewing, the delivery format identifying whether a program is provided by a linear content source or a non-linear content source video for each of the plurality of content sources;

presenting the program guide, for a particular device, displaying an identified program that has already aired via a linear content source, wherein an instance of the identified program is selectable for viewing on the particular device from a plurality of links corresponding with content sources, the program guide dynamically generating the links as the content becomes available for viewing through the non-linear content sources and dynamically removing the links as the content becomes unavailable for viewing through the non-linear content sources, and identifying other devices associated with the user through which the program is available for viewing, wherein a preference is set by the user for the devices identified as associated with the user for use in viewing content identifying a preferred device for viewing content, and wherein the preference is used to exclude content items from the program guide that are not available to the user on the preferred device.

18. The computer-readable storage device of claim 17, wherein the content available for viewing is available for immediate viewing.

19. The computer-readable storage device of claim 17, wherein dynamically generating the links to content prioritizes linear content sources of the plurality of content sources to dynamically generate the link based on business rules.

* * * * *